US010644584B2

(12) United States Patent
Chou et al.

(10) Patent No.: US 10,644,584 B2
(45) Date of Patent: May 5, 2020

(54) POWER CONTROLLER AND RELEVANT CONTROL METHOD CAPABLE OF PROVIDING OPEN-CIRCUIT PROTECTION

(71) Applicant: Leadtrend Technology Corporation, Zhubei, Hsinchu County (TW)

(72) Inventors: Kuan Hsien Chou, Zhubei (TW); Fong Cheng Yang, Zhubei (TW)

(73) Assignee: LEADTREND TECHNOLOGY CORPORATION, Zhubei, Hsinchu County (TW)

( * ) Notice: Subject to any disclaimer, the term of this patent is extended or adjusted under 35 U.S.C. 154(b) by 0 days.

(21) Appl. No.: 16/243,309

(22) Filed: Jan. 9, 2019

(65) Prior Publication Data

US 2019/0238048 A1 Aug. 1, 2019

(30) Foreign Application Priority Data

Jan. 30, 2018 (TW) ............................. 107103262 A

(51) Int. Cl.

| | |
|---|---|
| ***H02M 1/32*** | (2007.01) |
| ***H02M 1/08*** | (2006.01) |
| ***H02M 3/335*** | (2006.01) |
| ***H02M 1/00*** | (2006.01) |

(52) U.S. Cl.

CPC ............... *H02M 1/32* (2013.01); *H02M 1/08* (2013.01); *H02M 3/33523* (2013.01); *H02M 2001/0058* (2013.01)

(58) Field of Classification Search

CPC .. H02M 1/32; H02M 1/08; H02M 2001/0009; H02M 1/36; H02M 1/126; H02M 1/42; H02M 2001/325; H02M 3/24; H02M 3/33507; H02M 3/33523; H02M 3/33592

See application file for complete search history.

(56) References Cited

U.S. PATENT DOCUMENTS 9,985,543 B1 * 5/2018 Yi ..................... H02M 3/33592
2008/0247199 A1 * 10/2008 Djenguerian ........... H02M 1/32 363/50
2012/0262079 A1 * 10/2012 Lin ........................ H05B 45/37 315/206
2013/0223107 A1 * 8/2013 Zhang ............... H02M 3/33523 363/21.16

(Continued)

FOREIGN PATENT DOCUMENTS

TW 104135759 A * 10/2015 .............. H02M 1/32

*Primary Examiner* — Gustavo A Rosario-Benitez

(74) *Attorney, Agent, or Firm* — McClure, Qualey & Rodack, LLP

(57) ABSTRACT

A power controller provides open-circuit protection for a power supply when an open circuit occurs between a ground end of an auxiliary winding and an input ground. The power controller provides a PWM signal to determine an ON time and an OFF time of a power switch connected in series between an input voltage and the input ground. A deviation detector in the power controller detects a winding voltage at a floating end of the auxiliary winding during the ON time, and asserts an open protection signal when a variation of the winding voltage during the ON time fits a first predetermined condition, so as to keep the power switch turned OFF and provide the open-circuit protection.

17 Claims, 5 Drawing Sheets

10
12
$V_{AC}$
GND
$V_{IN}$
$I_{PRM}$
TF
$V_{OUT}$
LOAD
13
PRM
SEC
GND-O
DA
$V_{CC}$
VCC
CVCC
$V_{AUX}$
FA
DRV
$S_{DRV}$
SW
14
AUX
RA
CS
$V_{CS}$
RCS
GND
$V_{FB}$
FB
$I_{FB}$
PX
GA
GND
RB

(56) References Cited

U.S. PATENT DOCUMENTS

| | | | | |
|---|---|---|---|---|
| 2015/0214851 | A1 * | 7/2015 | Lin | H02M 3/33592 363/21.14 |
| 2016/0254753 | A1 * | 9/2016 | Malinin | H02M 3/33507 363/21.16 |
| 2017/0126132 | A1 * | 5/2017 | Chen | H02M 1/08 |
| 2017/0317600 | A1 * | 11/2017 | Kong | H02M 1/32 |

* cited by examiner

POWER CONTROLLER AND RELEVANT CONTROL METHOD CAPABLE OF PROVIDING OPEN-CIRCUIT PROTECTION

CROSS-REFERENCE TO RELATED APPLICATION

This application claims priority to and the benefit of Taiwan Application Series Number 107103262 filed on Jan. 30, 2018, which is incorporated by reference in its entirety.

BACKGROUND

The present disclosure relates generally to a power controller that provides open-circuit protection when an open circuit occurs in a power supply.

Power supply is almost a need for each of consumer electronics, to convert for example power from a power distribution grid into a power voltage or current source specifically required by a core circuit of an electric device. As power supplies are operating in proximity to people, regulations or laws normally require them to equip with protection mechanisms that prevent hazards from happening during abnormal conditions or environments.

Open-circuit and short-circuit tests, mimicking abnormal conditions or environments, are standard test procedures for each device on a printed circuit board (PCB) of a power supply, and a power supply presumably passes these tests if it does not cause any harmful consequences. These tests are preformed when a PCB is powered. Short-circuit test over a resistor on a PCB, for example, suddenly shorts the two ends of the resistor together, equivalently making the resistance of the resistor zero. Open-circuit test for the same resistor separates one of the two ends from the PCB, seemingly like the resistor is not properly soldered thereon.

An auxiliary winding of a power supply could cause output regulation out of control if it is not well soldered. A power controller using primary-side regulation (PSR) monitors and regulates output voltage in the secondary side by detecting a winding voltage at an end of the auxiliary winding in the primary side. If one end of the auxiliary winding that should short to input ground is wrongly disconnected from the input ground, waveform of the winding voltage deforms and the power controller will provide to its control loop wrong information, upon on which the output voltage could be regulated at an over-high voltage level, causing damage to electric apparatus powered by the output voltage.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
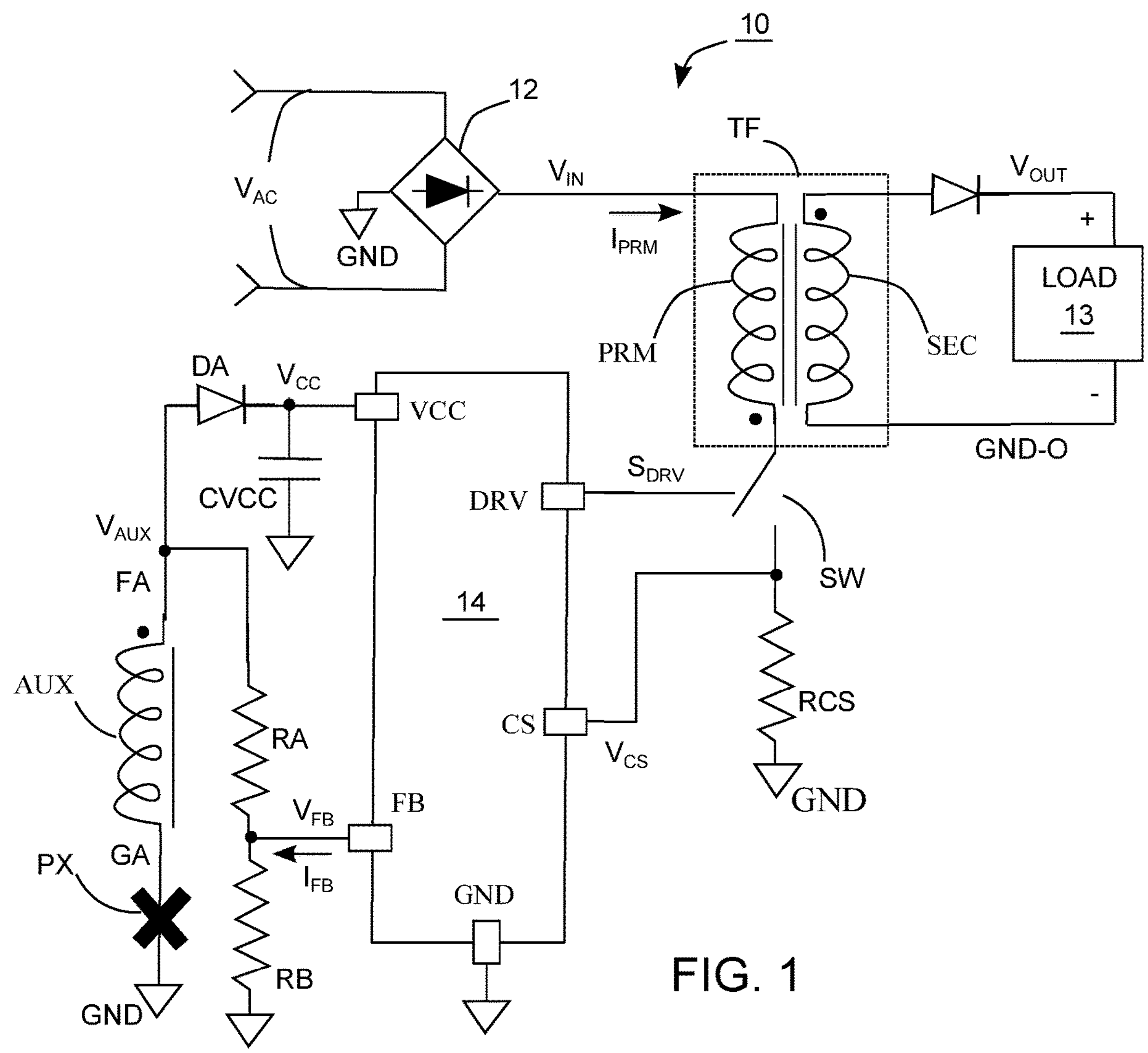
FIG. 1 demonstrates a power supply according to embodiments of the invention.

FIG. 1 demonstrates power supply 10 according to embodiments of the invention, where symbol PX indicates the location of an open circuit between auxiliary winding AUX and input ground GND. Power supply 10 includes power controller 14, which in some embodiments of the invention is a packaged integrated circuit with several pins. As illustrated in FIG. 1, these pins could be denoted as power-supply node VCC, driving node DRV, current-sense node CS, and feedback node FB, etc.

Bridge rectifier 12 rectifies alternating-current voltage $V_{AC}$ and provides input voltage $V_{IN}$ and input ground GND as two voltage source power lines. Transformer TF has primary winding PRM, secondary winding SEC and auxiliary winding AUX, each inductively coupled to another. As shown in FIG. 1, primary winding PRM, power switch SW, and current-sense resistor RCS are connected in series between input voltage $V_{IN}$ and input ground GND. Power controller 14 provides driving signal $S_{DRV}$ from driving node DRV to turn ON and OFF power switch SW, so as to alter the voltage across primary winding PRM. Secondary winding SEC reflectively generates alternating-current voltage, rectification of which provides output voltage $V_{OUT}$ and output ground GND-O to supply electric power to load 13.

Auxiliary winding AUX has two ends, one denoted as ground end GA and the other floating end FA. For normal operation, ground end GA should be soldered to electrically short to input ground GND. For open-circuit test over auxiliary winding AUX, however, ground end GA does not properly short to input ground GND, but is disconnected away from input ground GND. Therefore, there is an open circuit formed between auxiliary winding AUX and input ground GND, as symbol PX indicates in FIG. 1.

At floating end FA is winding voltage $V_{AUX}$. A diode can rectifies winding voltage $V_{AUX}$ to provide operation voltage $V_{CC}$ that supplies the electric energy required for operating power controller 14. Resistors RA and RB are connected in series between floating end FA and input ground GND, while the joint between resistors RA and RB shorts to feedback node FB. Feedback voltage FB is at feedback node FB, and feedback current $I_{FB}$ goes out of power controller 14 from feedback node FB.

Figure 2:
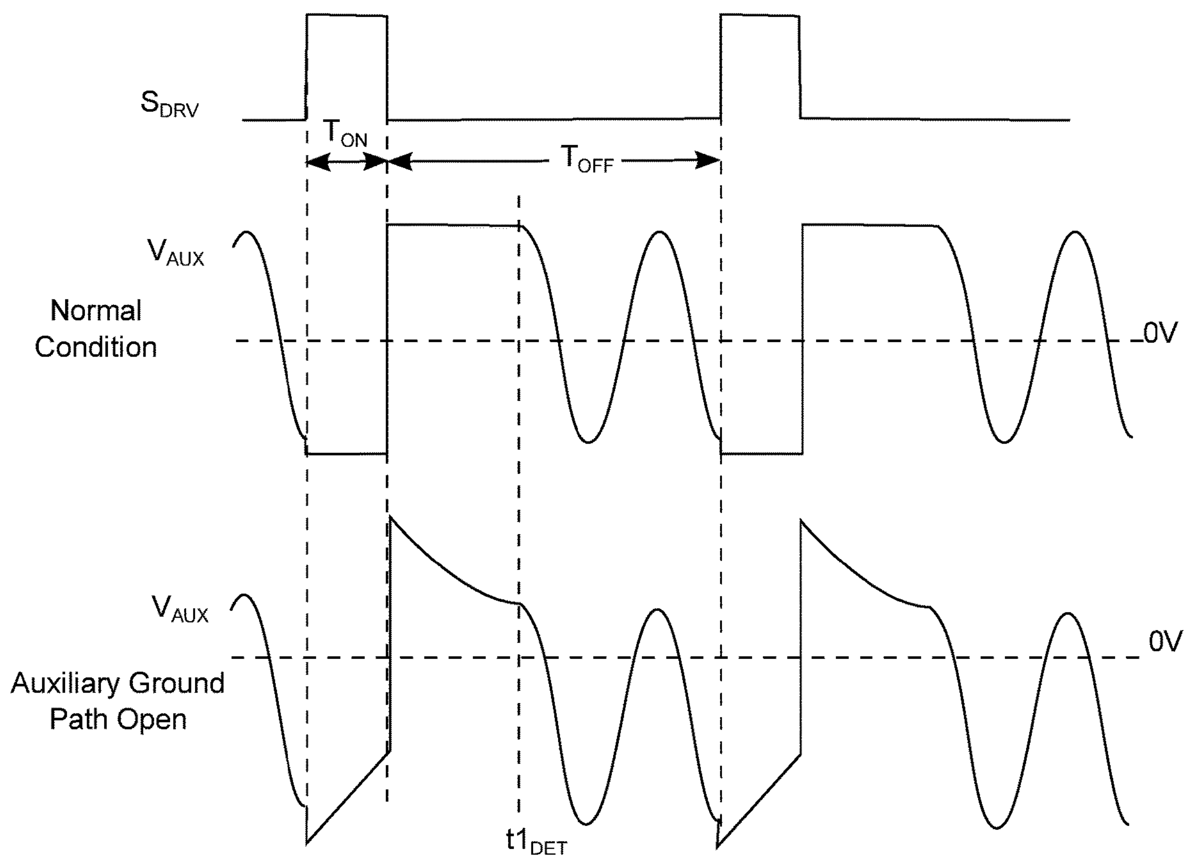
FIG. 2 shows waveforms of driving signal $S_{DRV}$, winding voltage $V_{AUX}$ under normal operation, and winding voltage $V_{AUX}$ under an open-circuit test over auxiliary winding AUX.

FIG. 2 shows waveforms of driving signal $S_{DRV}$, winding voltage $V_{AUX}$ under normal operation, and winding voltage $V_{AUX}$ under an open-circuit test over auxiliary winding AUX.

As demonstrated in FIG. 2, the waveform of winding voltage $V_{AUX}$ under an open-circuit test is obviously different from that under normal operation. FIG. 2 just exemplifies deformation of winding voltage $V_{AUX}$ due to an open-circuit test. Nevertheless, how winding voltage $V_{AUX}$ actually deforms depends on actual parameters of electric devices and parasitic elements, including resistance, capacitance, and inductance for example, in the whole circuit.

Driving signal $S_{DRV}$ is a PWM (pulse-width modulation) signal, generated based on another PWM signal $S_{PWM}$, capable of determining ON time $T_{ON}$ and OFF time $T_{OFF}$ of power switch SW. Logically, driving signal $S_{DRV}$ and PWM signal $S_{PWM}$ are the same. Power switch SW is turned ON during ON time $T_{ON}$, and OFF during OFF time $T_{OFF}$.

Power controller 14 employs PSR to regulate output voltage $V_{OUT}$. At time point $t1_{DET}$ shown in FIG. 2, power controller 14 detects winding voltage $V_{AUX}$ via resistors RA and RB, so as to indirectly detect output voltage $V_{OUT}$ in the secondary side. As demonstrated in FIG. 2, winding voltage $V_{AUX}$ at time point $t1_{DET}$ under an open-circuit test is much less than that under normal operation. Accordingly, if nothing equips power controller 14 to deal with the deformation of winding voltage $V_{AUX}$ under an open-circuit test, power controller 14 could wrongly acknowledge output voltage $V_{OUT}$ is too low, and, as a result, starts increasing the power converted to pull up output voltage $V_{OUT}$. Output voltage $V_{OUT}$ might become over high eventually and damage load 13 that receives power from output voltage $V_{OUT}$.

Figure 3:
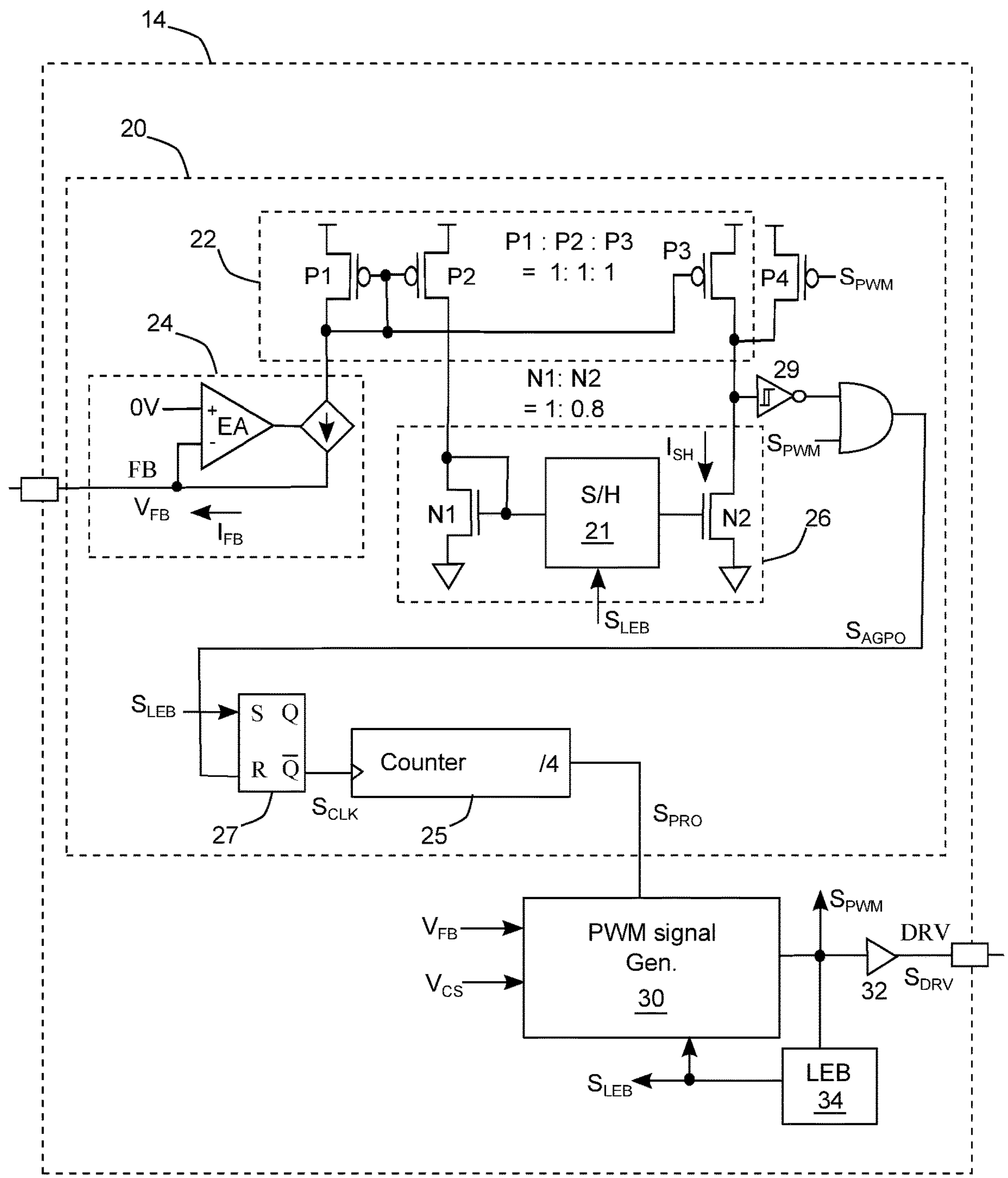
FIG. 3 shows a power controller with a PWM signal generator and a deviation detector.

FIG. 3 shows power controller 14, including PWM signal generator 30 and deviation detector 20.

PWM signal generator 30 generates PWM signal $S_{PWM}$ in response to feedback voltage $V_{FB}$ and current-sense voltage $V_{CS}$, two inputs for PWM signal generator 30. Using PWM signal $S_{PWM}$ as an input, driver 32 provide driving signal $S_{DRV}$ with appropriate voltage levels to drive power switch SW. Basically, PWM signal $S_{PWM}$ and driving signal $S_{DRV}$ are the same in logic, and each can define ON time $T_{ON}$ and OFF time $T_{OFF}$ of power switch SW.

Deviation detector 20 connects to feedback node FB, and, during ON time $T_{ON}$, it detects via resistor RA winding voltage $V_{AUX}$ at floating end FA. When winding voltage $V_{AUX}$ has variation fitting a predetermined condition during ON time $T_{ON}$, deviation detector 20 asserts open protection signal $S_{PRO}$ to stop PWM signal generator from providing PWM signal $S_{PWM}$ and keep PWM signal $S_{PWM}$ "0" in logic, so as to turn OFF power switch SW constantly. Power conversion accordingly stops, and, because of lack of power conversion, output voltage $V_{OUT}$ is not able to rise anymore, so open-circuit protection for open circuit PX occurring between ground end GA and input ground GND is thus achieved.

Figure 4:
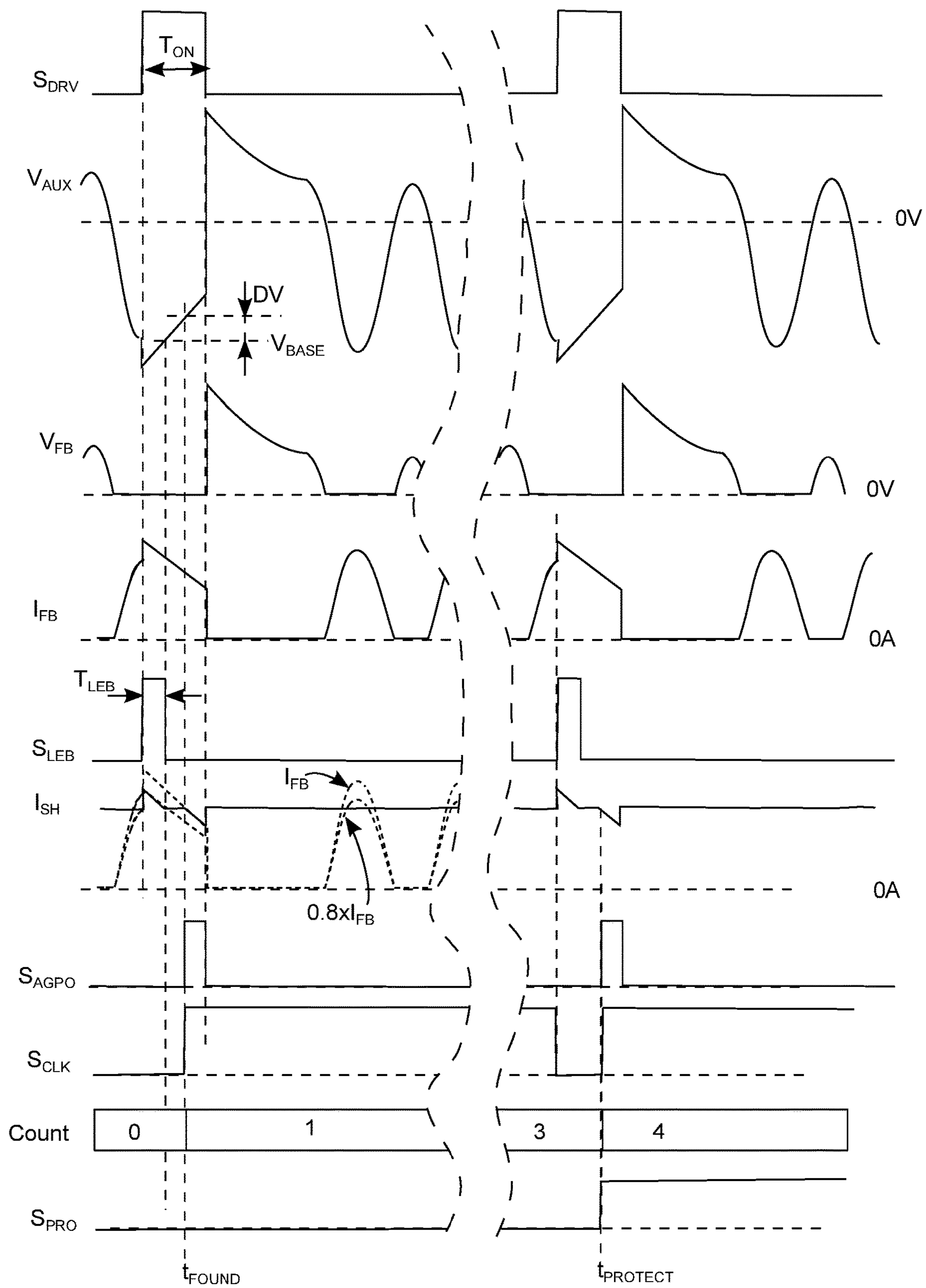
FIG. 4 shows waveforms of some signals in FIG. 3 under an open-circuit test.

Refer to FIG. 4, which shows waveforms of some signals in FIG. 3 under an open-circuit test.

As driving signal $S_{DRV}$ turns ON and OFF power switch SW, winding voltage $V_{AUX}$ vibrates. Please note that winding voltage $V_{AUX}$ is not constant during ON time $T_{ON}$, but changes to have variation. Within ON time $T_{ON}$ at the end of leading-edge blanking (LEB) time $T_{LEB}$, deviation detector 20 records winding voltage $V_{AUX}$, which at that time equals to base voltage $V_{BASE}$. Later on within ON time $T_{ON}$, if winding voltage $V_{AUX}$ differs from the base voltage $V_{BASE}$ more than a predetermined difference, deviation detector 20 could assert open protection signal $S_{PRO}$. Purpose and function of LEB time $T_{LEB}$ will be detailed later. It is a mere example to sample winding voltage $V_{AUX}$ at the end of LEB time $T_{LEB}$ as base voltage $V_{BASE}$, and the invention is not limited to. An embodiment of the invention could sample winding voltage $V_{AUX}$ at any moment within ON time $T_{ON}$ as base voltage $V_{BASE}$.

Deviation detector 20 in FIG. 3 includes clamping circuit 24, current mirrors 22 and 26, inverted smith trigger 29, SR flip-flop 27, and counter 25, connection of which is shown in FIG. 3.

Clamping circuit 24 is configured for clamping feedback voltage $V_{FB}$ at feedback node FB, making it not less than 0V, during ON time $T_{ON}$, by providing feedback current $I_{FB}$ out of power controller 14. Feedback current $I_{FB}$ during ON time $T_{ON}$ is positive, substantially equal to $-V_{AUX}/R_A$, where $R_A$ is the resistance of resistor RA in FIG. 1. As shown in FIG. 4, the waveform of feedback current $I_{FB}$ is substantially reverse to that of winding voltage $V_{AUX}$ below 0V.

Current mirror 22 duplicates feedback current $I_{FB}$, and the currents flowing through PMOS transistors P1, P2 and P3 could be 1:1:1 in proportion.

Current mirror 26 has NMOS transistors N1 and N2 and sampler 21 controlled by LEB signal $S_{LEB}$ defining LEB time $T_{LEB}$. LEB time $T_{LEB}$ starts with ON time $T_{ON}$ but is not longer than ON time $T_{ON}$, as shown in FIG. 4. During LEB time $T_{LEB}$, gates of NMOS transistors N1 and N2 electrically shorts to each other, and currents flowing through NMOS transistors N1 and N2 are 1:0.8 in proportion. Accordingly, during LEB time $T_{LEB}$, register current $I_{SH}$ provided by NMOS transistor N2 is 0.8 time feedback current $I_{FB}$. After the end of LEB time $T_{LEB}$, sampler 21 holds the gate voltage of NMOS transistor N2, equivalently sampling feedback current $I_{FB}$ at the end of LEB time $T_{LEB}$. In other words, after the end of LEB time $T_{LEB}$, register current $I_{SH}$ is held as a constant, equal to 0.8 time feedback current $I_{FB}$ at the end of LEB time $T_{LEB}$, as shown in FIG. 4. Register current $I_{SH}$ is capable of representing feedback current $I_{FB}$ at the end of LEB time $T_{LEB}$.

Inverted smith trigger 29 acts as a current comparator, comparing feedback current $I_{FB}$ with register current $I_{SH}$ during ON time $T_{ON}$. After LEB time $T_{LEB}$ and before the end of ON time $T_{ON}$, once feedback current $I_{FB}$ becomes less than register current $I_{SH}$, inverted smith trigger 29 makes signal $S_{AGPO}$ "1" in logic.

PMOS transistor P4 resets, during OFF time $T_{OFF}$, inverted smith trigger 29, making signal $S_{AGPO}$ "0" in logic.

Signal $S_{AGPO}$ and LEB signal $S_{LEB}$ together control SR flip-flop 27 to generate clock $S_{CLK}$, which is forwarded to clock input of counter 25. In FIG. 4, in the duration from the beginning of ON time $T_{ON}$ to time point $t_{FOUND}$ feedback current $I_{FB}$ always exceeds register current $I_{SH}$, so signal $S_{AGPO}$ and clock $S_{CLK}$ both are "0" in logic. At time point $t_{FOUND}$, signal $S_{AGPO}$ and clock $S_{CLK}$ both turn into "1" in logic because feedback current $I_{FB}$ becomes less than register current $I_{SH}$. It is derivable by circuit analysis that signal $S_{AGPO}$ turns from "0" into "1" if voltage difference DV between winding voltage $V_{AUX}$ and base voltage $V_{BASE}$ exceeds $-0.2V_{BASE}$. Thus, one condition for triggering an open-circuit protection is that variation of winding voltage $V_{AUX}$ is required to be more than $-0.2V_{BASE}$ after LEB time $T_{LEB}$, and deviation detector 20 checks whether this condition fits to assert signal $S_{AGPO}$.

$-0.2V_{BASE}$ is in association with base voltage $V_{BASE}$. It is a design choice for voltage difference DV larger than the predetermined threshold, $-0.2V_{BASE}$, to trigger an open-circuit protection and it is not intended to limit this invention, however. Other embodiments of the invention might trigger an open-circuit protection if voltage difference DV is larger than 0.1V for example.

According to one embodiment of the invention, signal $S_{AGPO}$ is forced to be "0" in logic during OFF time $T_{OFF}$ and LEB time $T_{LEB}$, and clock $S_{CLK}$ is reset to be "0" in the beginning of LEB time $T_{LEB}$ within the next ON time $T_{ON}$.

Counter 25 is connected to SR flip-flop 27, and coupled to inverted smith trigger 29. For every ON time $T_{ON}$, if the variation of winding voltage $V_{AUX}$ is so large that voltage difference DV exceeds $-0.2V_{BASE}$, or feedback current $I_{FB}$ is less than register current $I_{SH}$, counter 25 increases by 1, as shown in FIG. 4. Counter 25 counts how many times that voltage difference DV has exceeded $-0.2V_{BASE}$ or register current $I_{SH}$ has exceeded feedback current $I_{FB}$.

Clock $S_{CLK}$ causes the count of counter 25 to be 4 at time point $t_{PROTECTION}$ in FIG. 4, so open protection signal $S_{PRO}$ asserts, PWM signal generator 30 in response keeps PWM signal $S_{PWM}$ at "0" in logic, and power switch SW is turned OFF constantly, stopping power conversion and achieving open-circuit protection for the open circuit occurring between ground end GA and input ground GND. The necessity for the count of counter 25 to be 4 to assert open protection signal $S_{PRO}$ and trigger open-circuit protection is a mere example, and embodiments of this invention might use any number for the count of counter 25 to trigger open-circuit protection.

Figure 5:
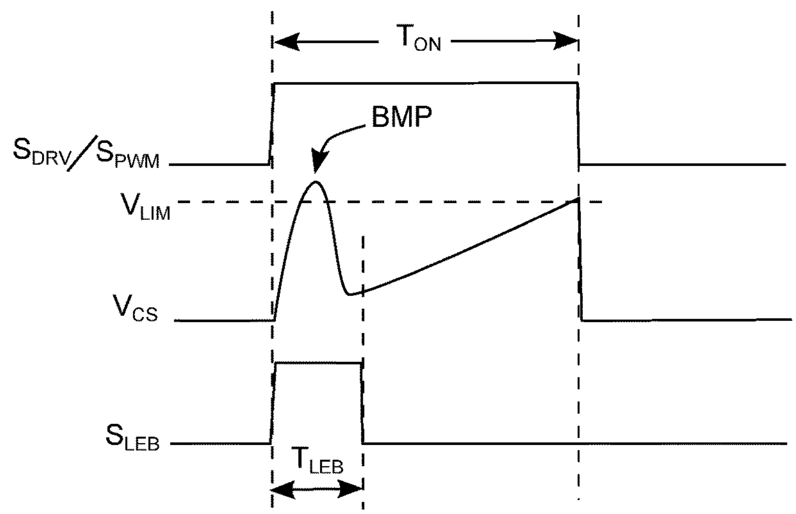
FIG. 5 demonstrates PWM signal $S_{PWM}$, current-sense voltage $V_{CS}$ and LEB signal $S_{LEB}$.

FIG. 5 demonstrates PWM signal $S_{PWM}$, current-sense voltage $V_{CS}$ and LEB signal $S_{LEB}$. In light of FIGS. 5 and 3, PWM signal generator 30 controls peaks of current-sense voltage $V_{CS}$ representing winding current $I_{PRM}$ through primary winding PRM. If current-sense voltage $V_{CS}$ goes up across limit voltage $V_{LIM}$, PWM signal generator 20 ends ON time $T_{ON}$ and starts OFF time $T_{OFF}$, so current-sense voltage $V_{CS}$ goes down and a peak of current-sense voltage $V_{CS}$ is therefore generated. Limit voltage $V_{LIM}$ could be in association with output voltage $V_{OUT}$. For example, if output voltage $V_{OUT}$ is below a voltage rating, PWM signal generator 30 increases limit voltage $V_{LIM}$, and a peak of current-sense voltage $V_{CS}$ increases accordingly to boost power conversion, expecting to pull up output voltage $V_{OUT}$. Therefore, PWM signal generator 30 regulates output voltage $V_{OUT}$ in response to limit voltage $V_{LIM}$ and current-sense voltage $V_{CS}$. From another perception, PWM signal generator 30 provides a signal path CPath that goes from output voltage $V_{OUT}$, to limit voltage $V_{LIM}$ and to a peak of current-sense voltage $V_{CS}$.

Signal path CPath is blocked however during LEB time $T_{LEB}$. LEB time generator 34, triggered by a rising edge of PWM signal $S_{PWM}$, provides LEB signal $S_{LEB}$ to define LEB time $T_{LEB}$, which is a specific time duration following the beginning of ON time $T_{ON}$ as shown in FIG. 5. During ON time $T_{ON}$, the inductance of primary winding PRM theoretically causes current-sense voltage $V_{CS}$ to increase over time in a linear way. Nevertheless, as shown in FIG. 5, waveform of current-sense voltage $V_{CS}$ has a bump BMP within LEB time $T_{LEB}$ because of discharge caused by the sudden connection provided by turned-ON power switch SW, and bump BMP could adversely impact the control of signal path CPath over output voltage $V_{OUT}$. According to an embodiment of the invention, during LEB time $T_{LEB}$, PWM signal generator 30 does not control power switch SW in response to the result of comparing current-sense voltage $V_{CS}$ with limit voltage $V_{LIM}$. In other words, during LEB time $T_{LEB}$, bump BMP is ignored and signal path CPath is blocked. That's why current-sense voltage $V_{CS}$ in FIG. 5 is allowed to exceed limit voltage $V_{LIM}$ during LEB time $T_{LEB}$ without ending ON time $T_{ON}$. After LEB time $T_{LEB}$, signal path CPath resumes, and ON time $T_{ON}$ ends when current-sense voltage $V_{CS}$ is larger than limit voltage $V_{LIM}$.

According to one embodiment of the invention, sampler 21 samples feedback current $I_{FB}$ at the end of LEB time $T_{LEB}$, so as to record base voltage $V_{BASE}$, but this invention is not limited to however. Sampler 21 according to embodiments of the invention might sample feedback current $I_{FB}$ and record base voltage $V_{BASE}$ at any time point within ON time $T_{ON}$.

Figure 6:
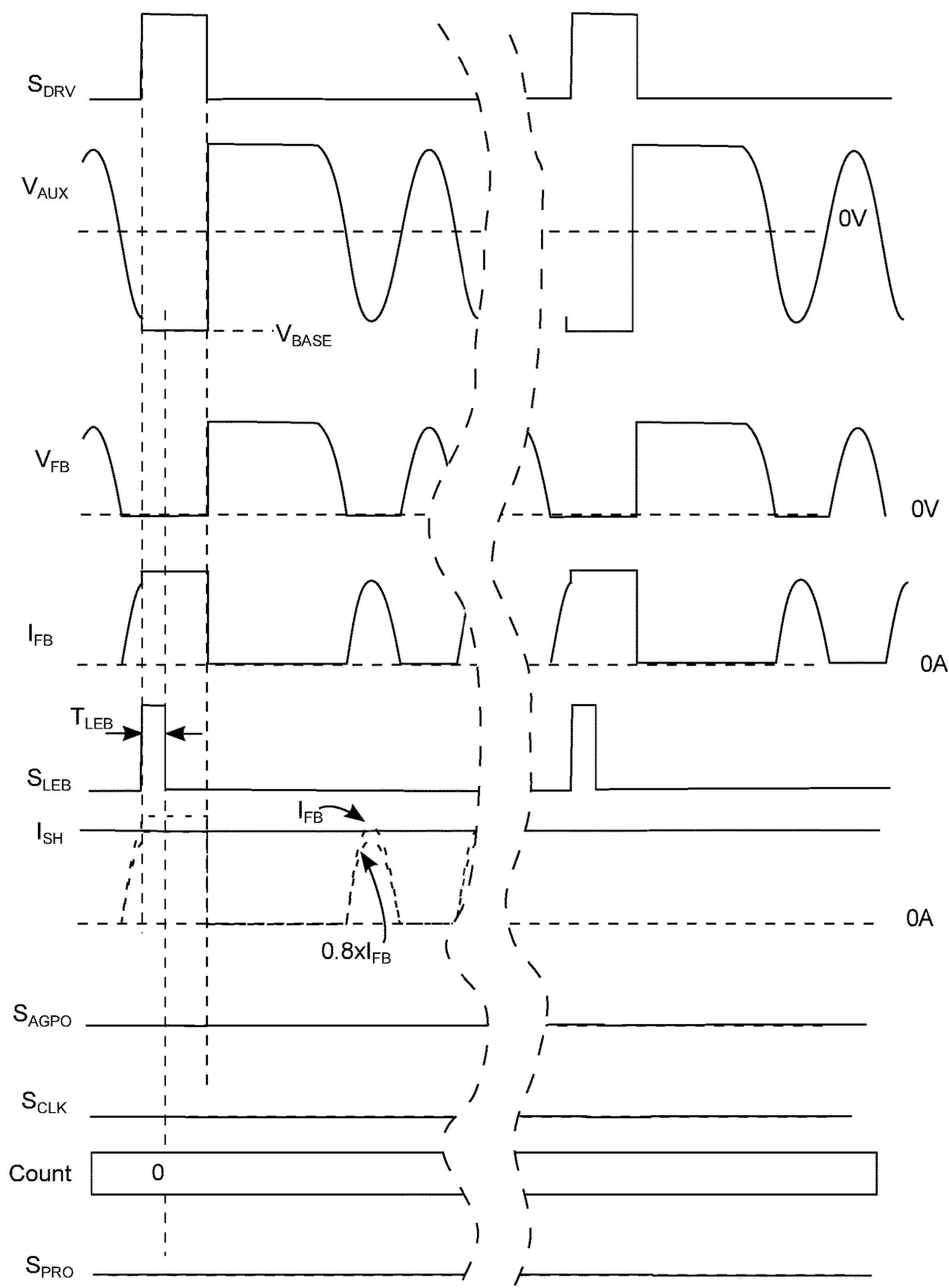
FIG. 6 illustrates waveforms of some signals in FIG. 3 under a normal operation.

FIG. 6 illustrates waveforms of some signals in FIG. 3 under a normal operation.

Winding voltage $V_{AUX}$ during ON time $T_{ON}$, as shown in FIG. 6, is about a constant without variation. In view of the waveforms in FIG. 6, base voltage $V_{BASE}$, generated by sampling winding voltage $V_{AUX}$ at the end of LEB time $T_{LEB}$, is also about that constant. Accordingly, winding voltage $V_{AUX}$ and base voltage $V_{BASE}$ during ON time $T_{ON}$ in FIG. 6 are about the same and have no difference between them, so they should not trigger open-circuit protection provided by power controller 14.

Referring FIGS. 6 and 3, register current $I_{SH}$ is about 0.8 time feedback current $I_{FB}$ all the time during ON time $T_{ON}$, so register current $I_{SH}$ is never larger than feedback current $I_{FB}$. Signal $S_{AGPO}$ and clock $S_{CLK}$ both remain at "0" in logic accordingly, and the count of counter 25 will be 0 all the time, not triggering open-circuit protection.

Based on the circuit analysis aforementioned, if there is an open circuit occurring at the location indicated by symbol PX in power supply 10 of FIG. 1, power controller 14 could timely stop power conversion by turning power switch SW OFF constantly, thereby providing open-circuit protection.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power controller in use of a power supply with a transformer including a primary winding, a secondary winding and an auxiliary winding, wherein the power supply includes a power switch connected in series with the primary winding between an input voltage and an input ground, and the auxiliary winding has a ground end and a floating end, where the ground end is for connecting to the input ground, the power controller comprising:

- a PWM signal generator for providing a PWM signal to control the power switch and to regulate an output voltage of the power supply, wherein the PWM signal determines an ON time and an OFF time of the power switch;
- a feedback node connected via a resistor to the floating end; and
- a deviation detector connected to the feedback node for detecting a winding voltage at the floating end and checking if the winding voltage changes to have within the ON time a second voltage different from a first voltage at a first time point within the ON time and a voltage difference between the second and first voltages fits a first predetermined condition during the ON time, wherein when the voltage difference fits the first predetermined condition during the ON time, the deviation detector asserts an open protection signal to keep the power switch turned OFF, so as to provide open-circuit protection for an open circuit occurring between the ground end and the input ground.

2. The power controller as claimed in claim 1, wherein if the voltage difference is larger than a predetermined threshold during the ON time, the deviation detector asserts the open protection signal.

3. The power controller as claimed in claim 2, wherein the predetermined threshold is in association with the first voltage.

4. The power controller as claimed in claim 1, wherein a feedback voltage is at the feedback node, and the deviation detector comprises:

- a clamping circuit for providing a feedback current during the ON time to clamp the feedback voltage not less than a predetermined voltage;

a sampler for sampling the feedback current at the first time point within the ON time to accordingly hold a register current representing the feedback current at the first time point; and a comparator for comparing the register current and the feedback current during the ON time, and asserting the open protection signal if the feedback current is less than the register current during the ON time.

5. The power controller as claimed in claim 4, wherein the first time point is an end of a leading-edge blanking time, and during the leading-edge blanking time the PWM signal generator does not control the power switch in response to a current-sense signal representing a winding current through the primary winding.

6. The power controller as claimed in claim 4, wherein the deviation detector comprises:

a counter coupled to the comparator, for asserting the open protection signal when a count of the counter exceeds a predetermined number.

7. A control method for providing open-circuit protection when an open circuit occurs between a ground end of an auxiliary winding and an input ground, wherein the control method is in use of a power controller of a power supply, the power supply includes a transformer with a primary winding, the auxiliary winding and a secondary winding, the power controller controls a power switch connected in series with the primary winding between an input voltage and the input ground, the auxiliary winding has the ground end and a floating end, while the ground end is for connecting to the input ground and the floating end connects to a feedback node via a resistor, and the secondary winding is for providing an output voltage and an output ground, the control method comprising:

providing a PWM signal to control the power switch and to regulate the output voltage, wherein the PWM signal determines an ON time and an OFF time of the power switch;

detecting, via the feedback node, a winding voltage at the floating end of the auxiliary winding;

checking if the winding voltage changes within the ON time to have a second voltage different from a first voltage at a first time point within the ON time, and a voltage difference between the second and first voltages fits a first predetermined condition during the ON time; and asserting an open protection signal if the voltage difference fits the first predetermined condition, to stop the PWM signal generator from providing the PWM signal and to keep the power switch turned OFF.

8. The control method as claimed in claim 7, wherein the control method comprises:

checking if the voltage difference is larger more than a predetermined threshold during the ON time; and asserting the open protection signal when the voltage difference is larger than the predetermined threshold during the ON time.

9. The control method as claimed in claim 8, wherein the predetermined threshold is in association with the first voltage.

10. The control method as claimed in claim 7, comprising:

providing a feedback current during the ON time to clamp a feedback voltage at the feedback node, so as to keep the feedback voltage not less than a predetermined voltage;

sampling the feedback current at the first time point within the ON time to accordingly hold a register current representing the feedback current at the first time point; and comparing the register current and the feedback current during the ON time; and asserting the open protection signal if the feedback current is less than the register current during the ON time.

11. The control method as claimed in claim 10, wherein the first time point is at an end of a leading-edge blanking time, and during the leading-edge blanking time the power controller does not regulate the output voltage of the power supply in response to a current-sense signal representing a winding current through the primary winding.

12. The control method as claimed in claim 10, comprising:

counting how many times the feedback current has been less than the register current and accordingly providing a count; and asserting the open protection signal when the count is equal to a predetermined number.

13. A power supply, comprising:

a transformer with a primary winding, an auxiliary winding and a secondary winding, wherein the auxiliary winding has a floating end and a ground end;

a power switch connected in series with the primary winding between an input voltage and an input ground, wherein the ground end is for connecting to the input ground; and a power controller providing a PWM signal to control the power switch, the power controller comprising a feedback node connected to the auxiliary winding via a resistor, the PWM signal determining an ON time and an OFF time of the power switch;

wherein the power controller detects a winding voltage at the floating end, checks if the winding voltage changes within the ON time to have a second voltage different from a first voltage at a first time point within the ON time, and when a voltage difference between the second and first voltages fits a first predetermined condition during the ON time, asserts an open protection signal to keep the power switch turned OFF, so as to provide open-circuit protection for an open circuit occurring between the ground end and the input ground.

14. The power supply as claimed in claim 13, wherein the power controller comprising:

a PWM signal generator for providing the PWM signal to control the power switch and to regulate an output voltage of the power supply; and a deviation detector connected to the feedback node for detecting the winding voltage at the floating end, comprising:

a clamping circuit for providing a feedback current during the ON time to clamp the feedback voltage not less than a predetermined voltage;

a sampler for sampling the feedback current at the first time point within the ON time to accordingly hold a register current representing the feedback current at the predetermined time point; and a comparator for comparing the register current and the feedback current during the ON time, and asserting the open protection signal if the feedback current is less than the register current during the ON time.

15. The power supply as claimed in claim 13, wherein if the voltage difference is larger than a predetermined threshold during the ON time, the power controller asserts the open protection signal.

16. The power supply as claimed in claim 15, wherein the voltage difference is in association with the first voltage.

17. The power supply as claimed in claim 15, wherein the voltage difference is a constant independent from the first voltage.

* * * * *